(12) United States Patent
Cummins et al.

(10) Patent No.: US 12,087,954 B2
(45) Date of Patent: *Sep. 10, 2024

(54) BATTERY PACK ASSEMBLY (71) Applicant: Aceleron Limited, London (GB)

(72) Inventors: Carlton Cummins, London (GB); Amrit Chandan, West Midlands (GB)

(73) Assignee: Aceleron Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/142,895

(22) Filed: May 3, 2023

(65) Prior Publication Data

US 2023/0275294 A1  Aug. 31, 2023

Related U.S. Application Data

(63) Continuation of application No. 17/901,301, filed on Sep. 1, 2022, now Pat. No. 11,677,113, which is a
(Continued)

(51) Int. Cl.
*H01M 50/20* (2021.01)
*H01M 10/48* (2006.01)
(Continued)

(52) U.S. Cl.
CPC ......... *H01M 50/20* (2021.01); *H01M 10/482* (2013.01); *H01M 50/213* (2021.01);
(Continued)

(58) Field of Classification Search
None
See application file for complete search history.

(56) References Cited

U.S. PATENT DOCUMENTS 9,620,763 B1    4/2017  Zeng et al.
2010/0304201 A1* 12/2010 Caumont ............. H01M 50/24
                                             429/178
(Continued)

FOREIGN PATENT DOCUMENTS

CN     101919085 A   12/2010
CN     102362371 A    2/2012
(Continued)

OTHER PUBLICATIONS

Machine translation of JP2008204986 (Year: 2008).*
(Continued)

*Primary Examiner* — Wyatt P Mcconnell
(74) *Attorney, Agent, or Firm* — Caesar Rivise, PC (57) ABSTRACT

A battery pack assembly (1) comprising two holding frames (3), wherein the two holding frames (3) hold a plurality of cells (2) between them, each cell (2) being held longitudinally between the two holding frames (3), wherein two or more of the plurality of cells (2) are connected by a conductive means (7), and wherein the two holding frames (3) are reversibly held together by a fastening means (10), wherein the fastening means (10) cause terminals of the cells (2) to be urged against the conductive means (7) and removal or loosening of the fastening means (10) enables the cells (2) to be freed from the assembly (1), at least one holding frame (3) comprising one or more elastomeric protrusions (6) and wherein the conductive means (7) are positioned such that parts of them lie between one or more elastomeric protrusions (6) and one or more cell terminals, such that the urging of the frames (3) together by the fastening means (10) causes the conductive means (7) to be urged into contact by the elastomeric protrusions (6) with said one or more terminals.

20 Claims, 8 Drawing Sheets

Related U.S. Application Data continuation of application No. 16/615,194, filed as application No. PCT/GB2017/051433 on May 23, 2017, now Pat. No. 11,469,466.

(51) Int. Cl.
  *H01M 50/213* (2021.01)
  *H01M 50/271* (2021.01)
  *H01M 50/502* (2021.01)
  *H01M 50/503* (2021.01)
  *H01M 50/51* (2021.01)

(52) U.S. Cl.
  CPC ....... *H01M 50/271* (2021.01); *H01M 50/502* (2021.01); *H01M 50/503* (2021.01); *H01M 50/51* (2021.01); *H01M 2220/20* (2013.01)

(56) References Cited

U.S. PATENT DOCUMENTS

| | | |
|---|---|---|
| 2011/0135993 A1 | 6/2011 | An et al. |
| 2011/0177373 A1 | 7/2011 | Pellenc |
| 2012/0251857 A1 | 10/2012 | Neuhold et al. |
| 2014/0065455 A1 | 3/2014 | Chuang et al. |
| 2015/0086823 A1 | 3/2015 | Liew |
| 2016/0172653 A1 | 6/2016 | Henderson et al. |
| 2016/0293910 A1 | 10/2016 | Claudel |
| 2016/0344072 A1 | 11/2016 | Chan et al. |
| 2018/0034020 A1 | 2/2018 | Neuss |
| 2018/0123096 A1 | 5/2018 | Mcarty |
| 2018/0130981 A1 | 5/2018 | Liu et al. |
| 2018/0331440 A1 | 11/2018 | Okamoto |

FOREIGN PATENT DOCUMENTS

| | | |
|---|---|---|
| CN | 102598350 A | 7/2012 |
| CN | 202503048 U | 10/2012 |
| CN | 103682191 A | 3/2014 |
| CN | 104393211 A | 3/2015 |
| CN | 104393211 B | 8/2016 |
| CN | 105917495 A | 8/2016 |
| EP | 2393141 A2 | 12/2011 |
| GB | 2545567 | 6/2017 |
| JP | 2006216471 A | 8/2006 |
| JP | 2008204986 * | 9/2008 |
| JP | 2009123398 A | 6/2009 |
| KR | 20170106933 A | 9/2017 |
| WO | WO2012082691 | 6/2012 |
| WO | WO2013137707 A1 | 9/2013 |
| WO | WO2018/215725 A1 | 11/2018 |

OTHER PUBLICATIONS

English abstract of JP2008204986.
English abstract of CN101919085A.
English abstract of CN102598350A.
English abstract of CN104393211A.
English abstract of JP2006216471A.
English abstract of CN202503048U.
English abstract of CN104393211B.
English abstract of CN105917495A.
English abstract of JP2009123398A.
Search Report for related Great Britain Patent Application No. GB1521887.8 dated Jul. 27, 2016.
Search Report for related Great Britain Patent Application No. GB1620810.0 dated Apr. 13, 2017.
International Search Report for corresponding PCT Application No. PCT/GB2017/051433 dated Jul. 13, 2017.
Office Action of related Chinese Patent Application No. 201780091207.6 dated Jan. 4, 2022.
Second Office Action and Search Report from corresponding Chinese Patent Application No. 201780091207.6. dated Jun. 16, 2022.
International Search Report for related PCT Application No. PCT/GB2019/053690 dated Mar. 20, 2020.
Search Report for related Great Britain Patent Application No. GB1821083.1 dated Jun. 20, 2019.
International Search Report for related PCT Application No. PCT/GB2019/053689 dated Mar. 31, 2020.
Search Report for related Great Britain Patent Application No. GB1821086.4 dated Jun. 20, 2019.
English abstract of CN103682191A.

* cited by examiner

BATTERY PACK ASSEMBLY

CROSS REFERENCE TO RELATED APPLICATIONS

This continuation application claims the benefit under 35 U.S.C. § 120 of application Ser. No. 17/901,301 filed on Sep. 1, 2022, which in turn is a continuation application of, and claims the benefit under 35 U.S.C. § 120, of application Ser. No. 16/615,194 (now U.S. Pat. No. 11,469,466) filed on Nov. 20, 2019 which in turn is a U.S. national phase application that claims the benefit under 35 U.S.C. § 371 of PCT/GB2017/051433, filed May 23, 2017, and all of whose entire disclosures are incorporated by reference herein.

FIELD OF THE INVENTION

The present invention relates to a battery pack assembly. Particularly, but not exclusively, the present invention relates to a lithium-ion battery pack assembly, and particularly to a large format battery pack assembly for example, for use with an electric vehicle such as an electric bike.

BACKGROUND OF THE INVENTION

Lithium-ion batteries are known in a variety of cell formats, cylindrical, prismatic and pouch cells are the most common varieties. In a cylindrical cell the electrode is tightly wound about itself and the terminals are typically found at either end of the cylinder, the electrode being contained within a casing, typically made from aluminium. Due to the shape of the cell packing efficiency may be low but the provision of spaces between adjacent cells is useful for thermal management purposes. The electrodes of prismatic cells can be wound, stacked or folded and are usually located within an aluminium or plastics housing. The terminals are often on one end of the cell which, coupled with the shape of the cell improves packing efficiency. Pouch cells typically have stacked or folded electrodes encased in a flexible plastics casing. The terminals of pouch cells may extend from different sides of the pouch but conveniently they may both extend from one side, for example the top, of the pouch.

In order to increase the power delivery from cells it is known to connect them in series. A number of cells connected in series may be termed a 'large format battery pack'. There appears to be no set definition of what constitutes a 'large format'. The UN, for example (e.g. in relation to the UN38.3 Procedure), states that a 'large battery' is one that has a mass in excess of 12 kg whereas some manufacturers specify that large batteries or large format battery packs have a power in excess of 1 kWh. For the purposes of this invention we consider that a large format battery pack is one with more than three cells (be they cylindrical, prismatic or pouch) connected in series.

Large format battery packs using cylindrical cells often have a plurality of cells, typically 15 or more cells, electrically connected and presented as a single unit called a battery module. In industry, these modules are typically assembled using permanent assembly techniques (structural adhesives, soldering etc.). Such permanent assembly techniques present challenges for repairing or reusing the modules (or the cells or other parts thereof), as the individual components of the assembly cannot easily be accessed or removed. This also makes it difficult to recycle the modules, as the various materials cannot easily be separated.

Accordingly, such production techniques can lead to energy storage products which are not aligned with EU waste management legislations and prohibits greater revenue opportunities in the repair and repurposing of batteries and battery modules.

BRIEF SUMMARY OF THE INVENTION

The present invention arose in an attempt to provide a more readily recyclable battery pack assembly.

According to the present invention there is provided a battery pack assembly comprising two holding frames, wherein the two holding frames hold a plurality of cells between them, wherein at least two cells of the plurality of cells are connected by a conductor, and wherein the two holding frames are reversibly held with respect to one another in a closed condition by a fastening means or fastener, wherein the fastening means or fastener cause terminals of the two cells to be urged against the conductor and removal or loosening of the fastener or fastening means enables the cells to be freed from the assembly, at least one holding frame comprising one or more elastomeric protrusions and wherein the conductor is positioned such that at least a part of the conductor lies between one or more elastomeric protrusions and one or more cell terminals, such that with the frames in the closed condition the conductor is urged into contact by the elastomeric protrusions with said one or more terminals.

The present invention allows for the complete disassembly of a large format battery pack assembly into its individual components. The ability to completely disassemble the assembly permits the module to be repaired via the replacement of individual cells or other components, allows individual components of the module to be reused for further applications at the end of the useful life of the complete assembly, and allows for improved recycling as each of the individual components of the module can be separated and sorted for recycling accordingly.

As well as assisting manufacturers to meet EU waste management legislation, the ability to reuse, repair and recycle individual components of battery modules would also save money and resources for the manufacturers. Individual or multiple cells may be replaced with ease, meaning the assemblies could be repeatedly rebuilt at end of life instead of being disposed. It also presents the opportunity for the reuse of cells from a module in other energy storage applications when they no longer perform in the original module application or when the module is no longer required.

Preferably the two holding frames are reversibly held together by the fastener or fastening means.

The conductor preferably connects the two cells in series.

In a further or more specific aspect of the invention there is provided a battery pack assembly comprising two holding frames, wherein the two holding frames hold a plurality of cells between them, each cell being held longitudinally between the two holding frames, wherein two or more of the plurality of cells are connected by a conductive means, and wherein the two holding frames are reversibly held together by a fastening means, wherein the fastening means cause terminals of the cells to be urged against the conductive means and removal or loosening of the fastening means enables the cells to be freed from the assembly, at least one holding frame comprising one or more elastomeric protrusions and wherein the conductive means are positioned such that parts of them lie between one or more elastomeric protrusions and one or more cell terminals, such that the urging of the frames together by the fastening means causes the conductive means to be urged into contact by the elastomeric protrusions with said one or more terminals.

In one embodiment of the present invention, the assembly consists of a set of cells positioned between two parallel holding frames, each cell being held longitudinally or laterally between the two holding frames by virtue of the fastening means being secured or 'tightened' to clamp the cells between the holding frames.

One of the frames may be or may provide an access lid, which can be opened or removed to gain access to the cells.

Each holding frame may comprise a generally flat base and side walls. If the holding frame is to be used with cylindrical cells at least one side wall, and preferably facing side walls, may further comprise a one or more concave arcuate sections complementary to the side wall of the cells to be inserted into the assembly. The holding frames may further comprise a plurality of protrusions extending perpendicularly from the base, for example to delimit or space the adjacent portions of the cells from one another. For example, the walls of the base protrusions may comprise a plurality of concave arcuate sections complementary to the facing portions of the cells to be inserted into the assembly.

The holding frame/access lid may be shaped to accommodate cells of different shapes than cylindrical ones, e.g. rectangular or other shapes.

Where cylindrical cells are deployed, each holding frame may therefore define a plurality of whole or part generally cylindrical regions, each defined by a concave arcuate side wall section and at least one concave arcuate base protrusion wall section, wherein each generally cylindrical region may seat a cylindrical cell.

For cylindrical cells, the conductor(s) or conductive means (e.g. one or more conductive plates) may be positioned laterally across the base of each holding frame and may lie across the multiple whole or part generally cylindrical regions (i.e. to bridge them) so as to electrically connect multiple cells seated therein. The conductive plates may be any shape which would cover more than one generally cylindrical region, such as linear, U-shaped, S-shaped, L-shaped, T-shaped, H-shaped, etc. The gaps in the walls of the generally cylindrical regions allow for the insertion of conductive plates in various arrangements; changing the arrangement of the conductive plates adapts the battery module for various applications using the same holding frame. Conductive plates may be provided on both holding frames, the arrangement of the conductive plates in each of the two holding frames preferably being complementary, such that they form a complete circuit when the plurality of cells are held within the two holding frames, electrically connecting all of the cells in the assembly in series. For example, the cells may be arranged with neighbouring cells alternatively positioned with the positive terminal upwards and the positive terminal downwards respectively, and the positive and negative terminals on each side being connected together, so that a complete circuit is formed. Means are provided to connect the appropriate conductive plates to external means for driving a vehicle or other equipment, control/processing means and so on. There may be electrical terminals connected to some of the conductive plates.

The two holding frames are held together by a fastener or fastening means, which may consist of a plurality of fastening screws. Each fastening screw may each thread through a hole in each of the two holding frame and act to compress the assembly, encouraging contact between the cells and the conductive means. The threaded holes in each of the holding frames may be positioned in the holding frame base protrusions.

In embodiments, the frame—cell— frame (FCF) architecture can be repeated plural times to form an FCFCF architecture, or FCFCF . . . . CF architecture. In such a case the 'end' frames, being those at the terminal edges of the battery pack, may have portions to receive the facing cell or cells whereas the 'intermediate' frames, being those between the end frames, may have a first side having portions to receive the facing cell or cells and a second side having portions to receive the facing cell or cells.

In embodiments, the battery pack assembly comprises one or more conduction breaking means or conduction breaker. A conduction breaking means or conduction breaker may be positioned between each cell terminal, and the conductor or conductive means, which may be a conductive plate. Preferably, a conduction breaking means or conduction breaker is provided between every cell terminal and the associated conductor or conductive means.

The purpose of the one or more conduction breaking means of conduction breaker is to break the electrical circuit between a cell and the conductor or conductive means, when said cell exceeds a prescribed electrical and/or thermal limit. Upon exceeding a prescribed electrical and/or thermal limit, the conduction breaking means of conduction breaker severs the connection of the failed cell, i.e. a cell that has exceeded a prescribed electrical and/or thermal limit, isolating said failed cell from the rest of the battery pack assembly.

The conduction breaking means or conduction breaker may comprise a first conductive portion for making contact with the cell terminal, a second conductive portion for making contact with the conductor or conductive means, an insulating portion, and a conduction breaker portion. The conduction breaking means or conduction breaker may comprise a metallic alloy, or a multi-metallic element and may comprise a bimetal fuse. The conduction breaker portion may comprise a low melting material, for example, a metal such as silver, or silver plated copper, tin, or zinc, or alloys of the same, which melts upon exceeding the electrical and/or thermal limit determined by the melting point of the material.

Advantageously, the contact between the conduction breaking means or conduction breaker with both the conductive means one on major surface, and the cell terminal on the opposite major surface, is increased upon 'tightening' of the fastening means when the battery pack assembly is under compression. More advantageously, the one or more conduction breaking means or conduction breaker allow the battery pack assembly to continue to function upon failure of an individual cell, by isolating the one or more failed cells from the other functioning cells in the battery pack assembly.

The elastomeric protrusions are preferably positioned generally where the terminals of one or more cells lie when the cells are seated within the holding frames. The conductive means may be positioned such that parts of them lie between the elastomeric protrusions and one or more cell terminals, such that the elastomeric protrusions act to further encourage contact between the one or more cell terminals and the conductive means when the assembly is under compression from the 'tightening' of the fastening means. This ensures quality electrical contacts are maintained even when the assembly undergoes vibration.

In embodiments, the battery pack assembly comprises a monitoring means or monitor for monitoring the status of each cell. The monitoring means may comprise an integrated electrical circuit, which monitors the status of each cell by detecting the number of triggered conduction breaking means or conduction breakers resulting from failed cells, i.e. a cell that has exceeded a prescribed electrical and/or thermal limit, within the battery pack assembly. The monitoring means may comprise a method of determining the condition of the battery pack assembly. For example, the monitoring means may transmit data, which has been collected about the status of each cell within the assembly, to be fed through an algorithm to compare with the optimal function of the assembly, to determine the number of fully functioning cells and the number of failed cells. Advantageously, this provides information on the overall condition and remaining useful life of the battery pack assembly. More advantageously, this information may be used to inform the user of maintenance requirements, and of potential safety hazards from using an under-performing battery pack assembly.

The battery pack assembly may be any format including laminates, pouch, cylindrical, and/or prismatic.

The design of the assembly also allows for the integration of liquid cooling for high power applications.

BRIEF DESCRIPTION OF THE DRAWINGS

Embodiments of the present invention will now be described, by way of example only, with reference to the accompanying figures, in which.

DETAILED DESCRIPTION OF THE INVENTION

Figure 1:
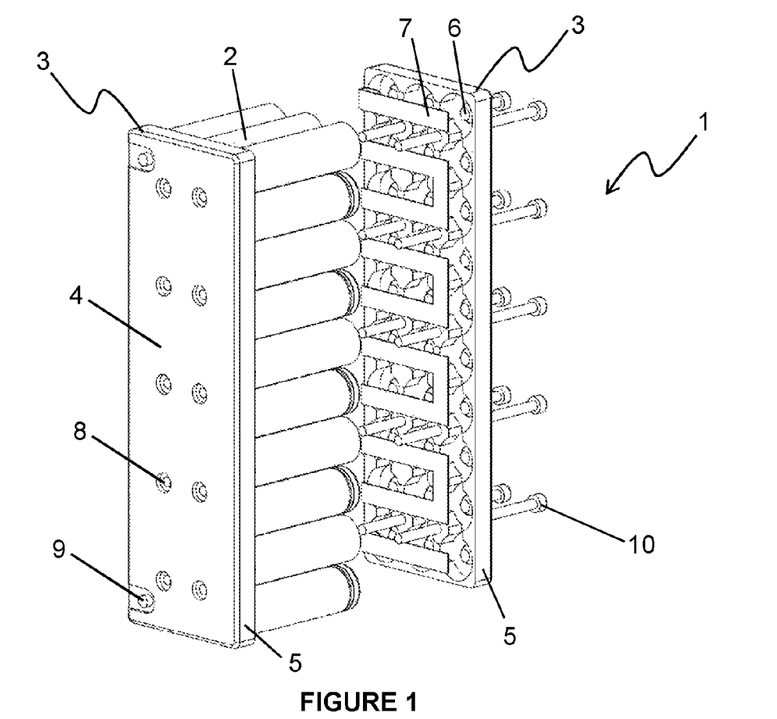
FIG. 1 shows a partially exploded view of a battery pack assembly according to the invention.

Referring to FIG. 1, a first embodiment of a battery pack assembly 1 is shown. The battery pack assembly 1 comprises a plurality of lithium-ion cells 2, each cell being held longitudinally between two holding frames 3. The generally rectangular holding frames 3 (which may be made of a plastic material for example) each comprise a generally flat base 4, side walls 5 extending generally perpendicularly from the base 4, elastomeric members 6, conductive plates 7, screw slots 8 and battery terminals 9. The holding frames 3 are reversibly held together by fastening screws 10, with the plurality of cells 2 held in place between the holding frames 3 by the compressive force of the fastening screws 10, which each thread through a screw slot 8 in each of the two holding frames 3.

Figure 2:
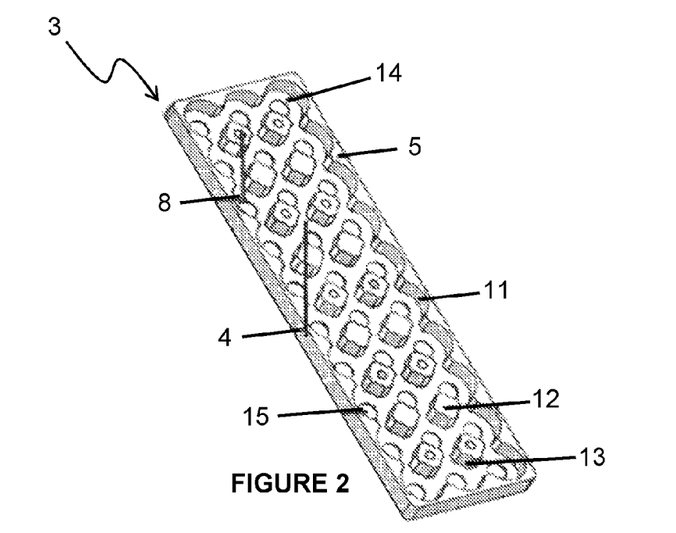
FIG. 2 shows a holding frame according to the invention.

Referring to FIG. 2, one embodiment of a holding frame 3 is shown. The side walls 5 of the holding frame 3 each comprise a plurality of concave arcuate side wall sections 11. A plurality of base protrusions 12 also extend perpendicularly from the base 4. The side walls of the base protrusions 12 may comprise a plurality of concave arcuate protrusion wall sections 13. Each concave arcuate side wall section 11 in combination with at least one concave arcuate protrusion wall section 13 thereby defines part of a generally cylindrical region 14 to seat a cylindrical cell 2. The screw slots 8 for the receiving of the fastening screws 10 are positioned in some of the base protrusions 12. The base 4 further comprises a plurality of recesses 15, in each of which may sit an elastomeric member 6 forming an elastomeric protrusion. This may be of rubber, a rubber compound, a plastics material and so on.

Instead of actuate sections, for accommodating generally cylindrical cells, the protrusions may be otherwise shaped to accommodate other cell shapes, eg generally planar intersections or square to accommodate rectangular or square cells. In the past the cells may be of any desired shape.

Figure 3:
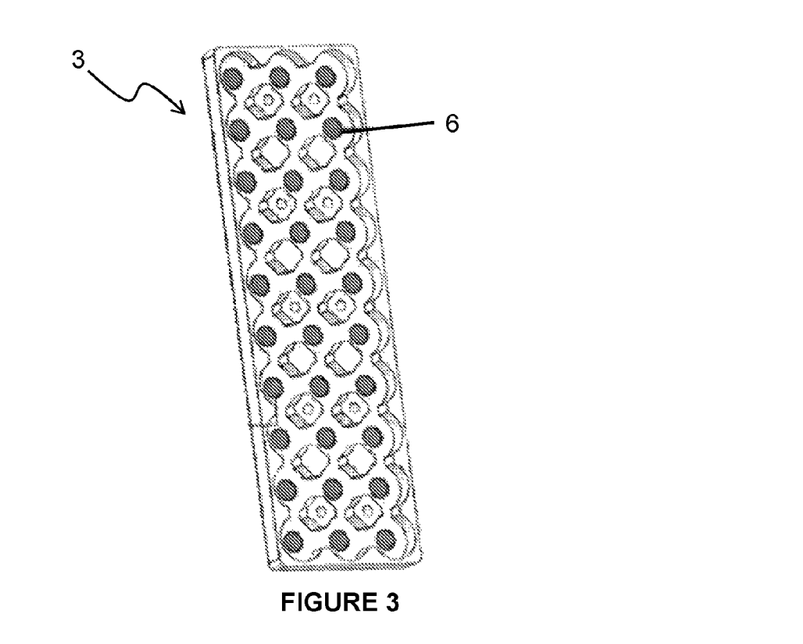
FIG. 3 shows the holding frame of FIG. 2 with the elastomeric members inserted.

FIG. 3 shows the holding frame of FIG. 3, wherein each of the recesses 15 is fitted with an elastomeric member 6.

Figure 4:
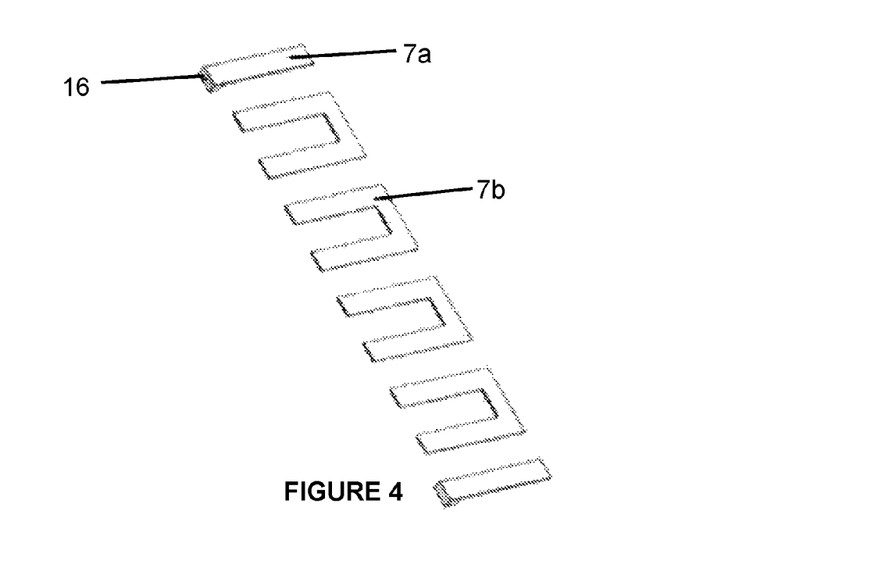
FIG. 4 shows an arrangement of conductive plates.

FIG. 4 shows one possible arrangement of the conductive plates 7 to be inserted into a holding frame 3a. In this example, three cells would be electrically connected by each of the two linear conductive plates 7a, and six cells would be electrically connected by each of the four U-shaped conductive plates 7b. An opposing holding frame 3b (not shown) will be associated with an arrangement of conductive plates 7 complementary to the arrangement of conductive plates 7 inserted into the holding frame 3a, such that all of the plurality of cells 2 are electrically connected in a desired arrangement, for example in series, in parallel, or in series-parallel (i.e. wherein one set of cells in parallel are connected in series with one or more further sets of cells also in parallel). The end plates 7a each have projections 16 which connect with the battery terminals 9 on one of the holding frames 3, to enable the plurality of cells 2 to be connected to an external circuit.

Figure 5:
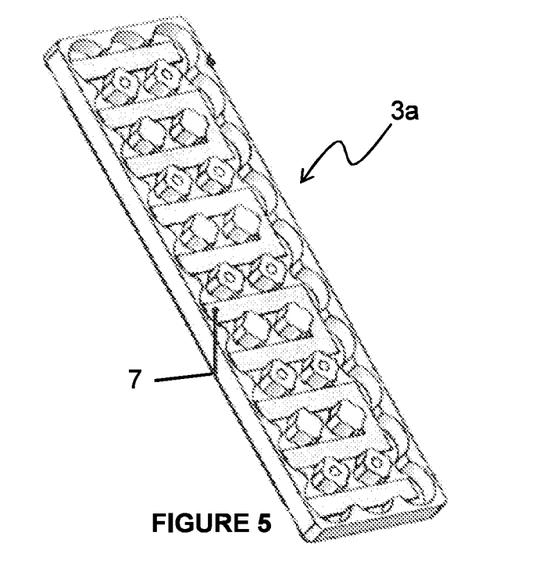
FIG. 5 shows the conductive plates of FIG. 4 inserted into the holding frame of FIG. 2 or 3.

FIG. 5 shows the holding frame 3a in combination with conductive plates 7 of FIG. 4. The conductive plates 7 are positioned across the base 4 of the holding frame 3a and are positioned to extend across a plurality of generally cylindrical regions 14, so as to electrically connect a plurality of cells 2 when the plurality of cells 2 are each positioned within a respective generally cylindrical region 14 and held between the holding frames 3. The compression caused by the tightening of the fastening screws 10 encourages contact between the plurality of cells 2 and the conductive plates 7, wherein the conductive plates 7 are further urged towards the plurality of cells 2 by the elastomeric members 6 urging the conductive plates 7 upwardly, ensuring robust electrical contacts.

Figure 6:
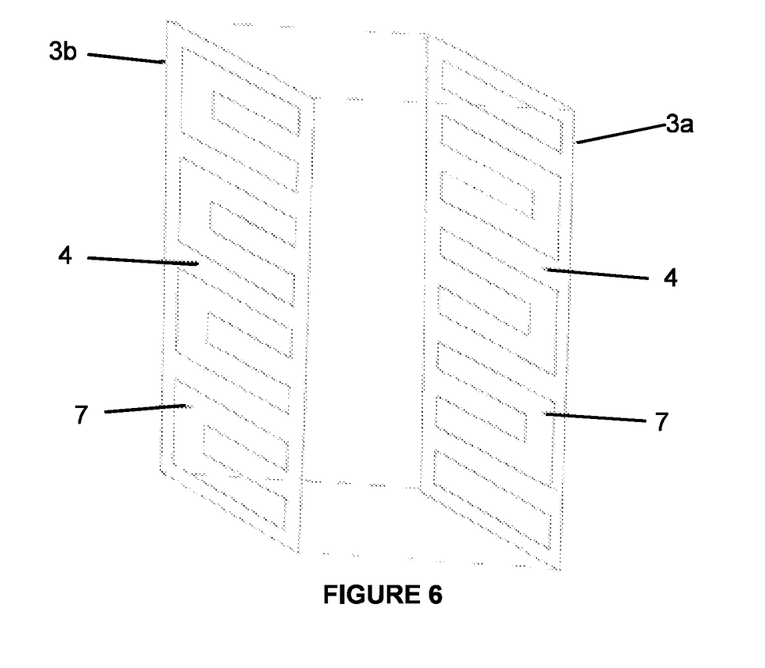
FIG. 6 shows two holding frames, each with conductive plates inserted, to form a complete circuit once the plurality of cells are inserted.

FIG. 6 shows one example of how the conductive plates 7 may be positioned across the bases 4 of each of the two holding frames 3a and 3b to form a complete circuit (once the plurality of cells 2 are inserted and compressed by the fastening means). Each of the plurality of cells 2 must be orientated such that the polarity of each cell 2 opposes the polarity of the adjacent cell in the series (for example, the first cell in the series is positioned with the positive terminal positioned towards holding frame 3a, the second cell in the series is positioned with the positive terminal positioned towards holding frame 3b, and so on).

Instead of screws (and threaded holes into which the screws are located), other fastening means which can be tightened to clamp or urge the plates towards each other may be provided.

Instead of terminals 9 on the holding frame 3 connecting to tabs 16 of the conductive plates 7, other connecting means may be provided to connect the arrangement of batteries to an external circuit. This includes, but is not limited to, an arrangement wherein the external circuit connects directly to the conductive means, an arrangement wherein the two terminals 9 are not positioned on the same holding frame 3, or an arrangement wherein there are more than two terminals 9 to allow more than one circuit to be independently connected to the module, wherein the conductive means arrangement can be varied to select how many cells 2 are connected to each of the connected circuits respectively.

Conductive means and/or elastomeric protrusions may be necessary just on one side of a cell array in some embodiments.

In embodiments one of the holding frames (generally an upper most one) may be an access lid. This can be removed or perhaps opened to enable access to cells within, for replacement or maintenance of the cells. The access lid may have conductive means and perhaps also elastomeric portions or may in other embodiments not be provided with these, in which case the electrical connections are all made at the side of the cells distal from the access lid.

Figure 7:
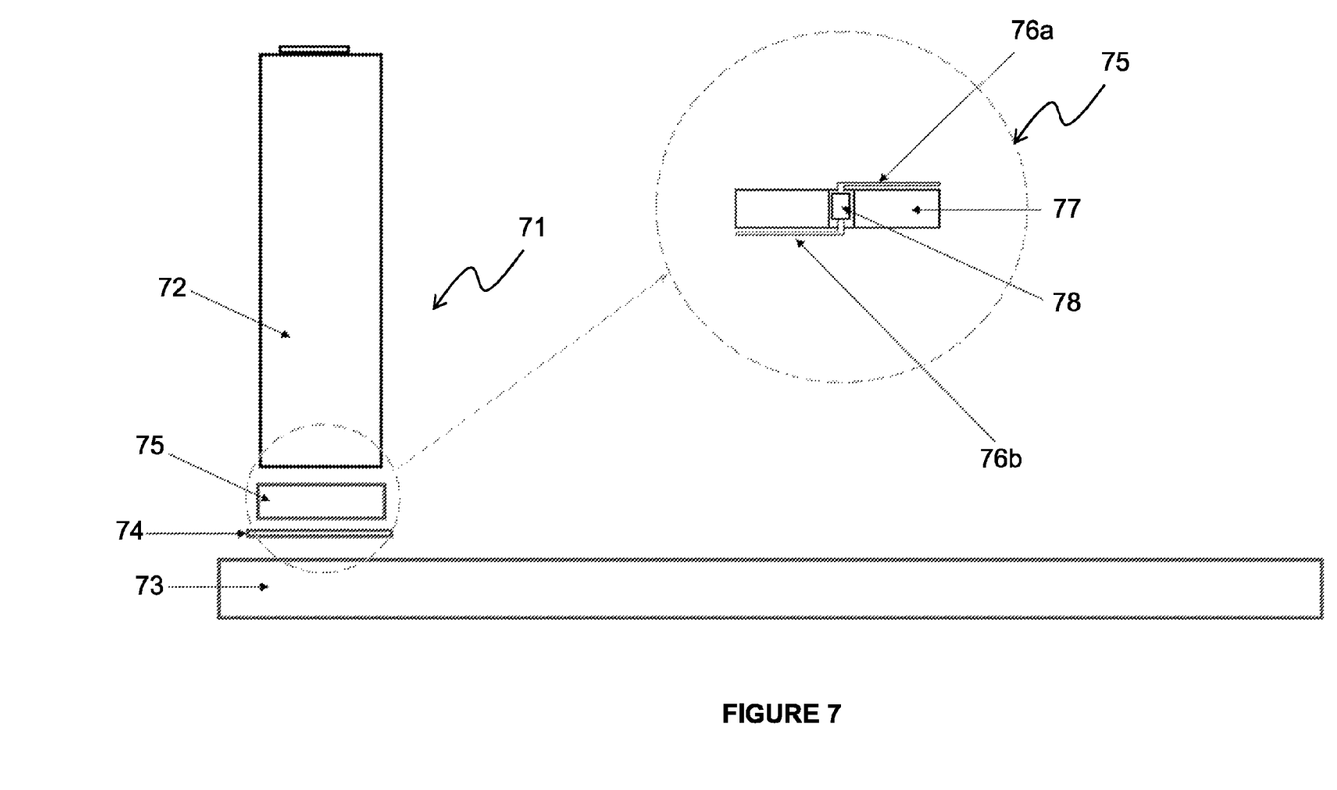
FIG. 7 shows an embodiment of a section of a battery pack assembly comprising a conduction breaking means.

FIG. 7 shows an embodiment of a section of a battery pack assembly 71 according to the invention. The battery pack assembly 71 comprises a plurality of cells 72 (only one shown), a pair of holding frames 73 (only one shown), a conductive plate 74, and a conduction breaking means or conduction breaker 75. The conduction breaker 75 comprises a first conductive portion 76a, a second conductive portion 76b, an insulating portion or body 77, and a conduction breaker 78. The first conductive portion 76a makes contact with a terminal of the cell 72. The second conductive portion 76b makes contact with the conductive plate 74. The conduction breaker 78 is positioned between the first conductive portion 76a and the second conductive portion 76b, within the insulating portion 77. The first conductive 1c, portion 76a, the conduction breaker 78, and the second conductive portion 78b are electrically connected. In use, electrical current flows from the cell 72, through the first conductive portion 76a, the conduction breaker 78, and the second conductive portion 78b, to the conductive plate 74. If the electrical or thermal limit of the conduction breaker 78 is exceeded, then the conduction breaker 78 will break the electrical circuit between a cell 72 and the conductive plate 74. The conduction breaker 75 severs the conduction of the failed cell 72 from the battery pack assembly 71 so that it may continue to function with the remaining functional cells (not shown). In prior art cell designs the conduction breakers are spot-welded to the cells and/or the conductive plates to make a robust and effective electrical connection. Advantageously, because of the plurality of elastomeric projections the conductive portions 76a, 76b of the conduction breaker 75 are urged into intimate contact with the respective connection of the battery pack assembly, thereby providing additional safety performance without compromising the ease of assembly/disassembly of the battery pack.

Figure 8:
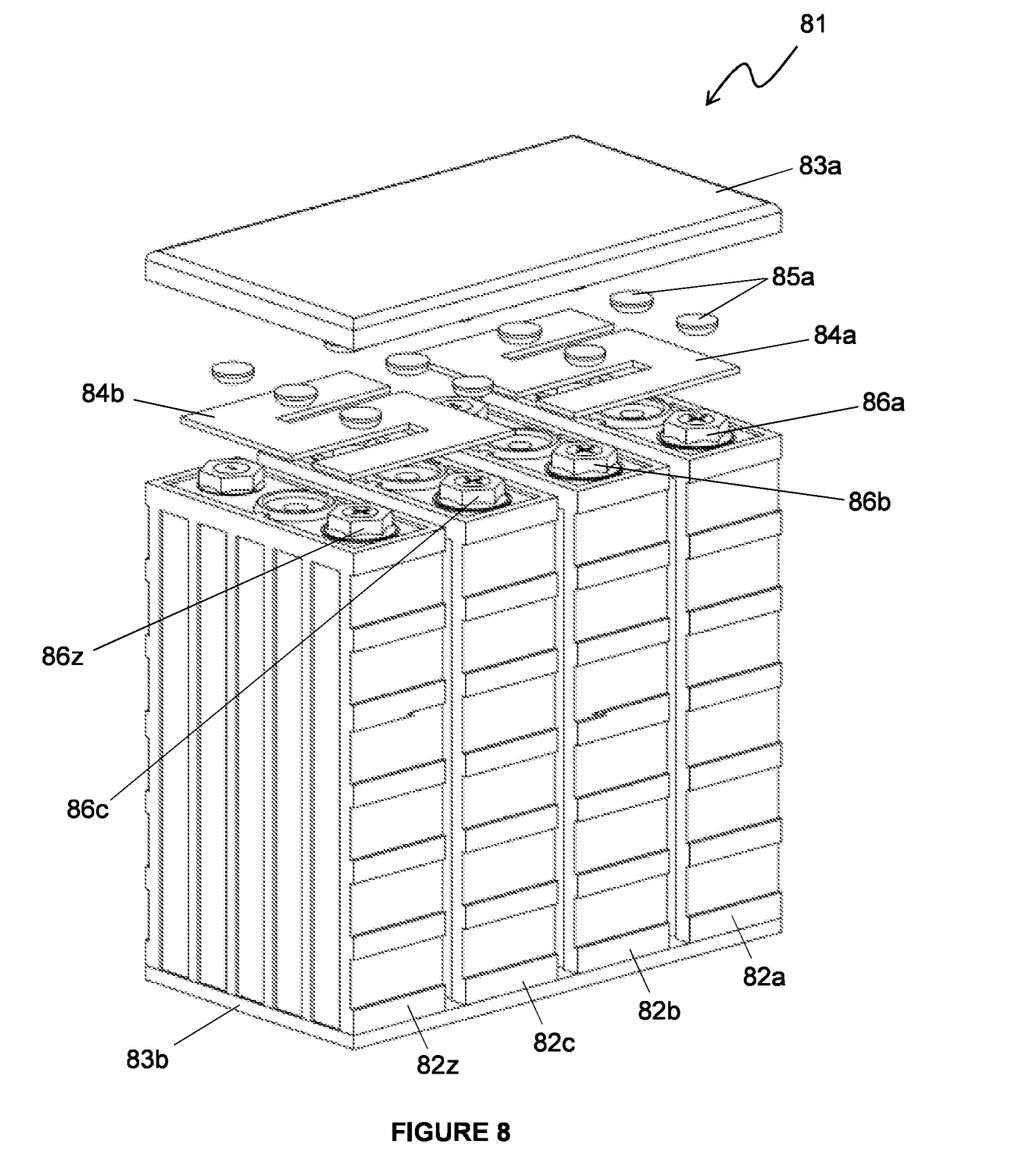
FIG. 8 shows an embodiment of a second battery pack assembly according to the invention.

FIG. 8 shows an exploded view of an embodiment of a prismatic cell battery pack assembly 81. The prismatic cell battery pack assembly 81 comprises a number of cells 82a, 82b, 82c . . . 82z (where the total number of cells is chosen by design requirements), a top holding frame 83a, a base holding frame 83b, a first conductive plate 84a, a second conductive plate 84b, and a set of elastomeric protrusions 85a. The cells 82a-82z each comprise a respective cell terminal 86a-86z. The set of elastomeric protrusions 85a are positioned between the holding frame 83a and the conductive plate 84a. In use, the set of elastomeric protrusions 85a are in contact with the holding frame 83a and the conductive plate 84a. The first conductive plate 84a provides an electrical connection between the cell terminals 86a and 86b. The second conductive plate 84b provides an electrical connection between the cell terminals 86c and a successive cell, and so on. The battery pack assembly 81 may be fastened together with fastening means (not shown), which urges together the holding frame 83a, the set of elastomeric protrusions 85a, the conducive plate 84a, and the cell terminal 86a to provide solid contact between the cell terminal 86a and the conductive plate 84a. Advantageously, the prismatic cell battery pack 81 may be disassembled into its constituent parts when not in use, or for repair or reuse.

Figure 9:
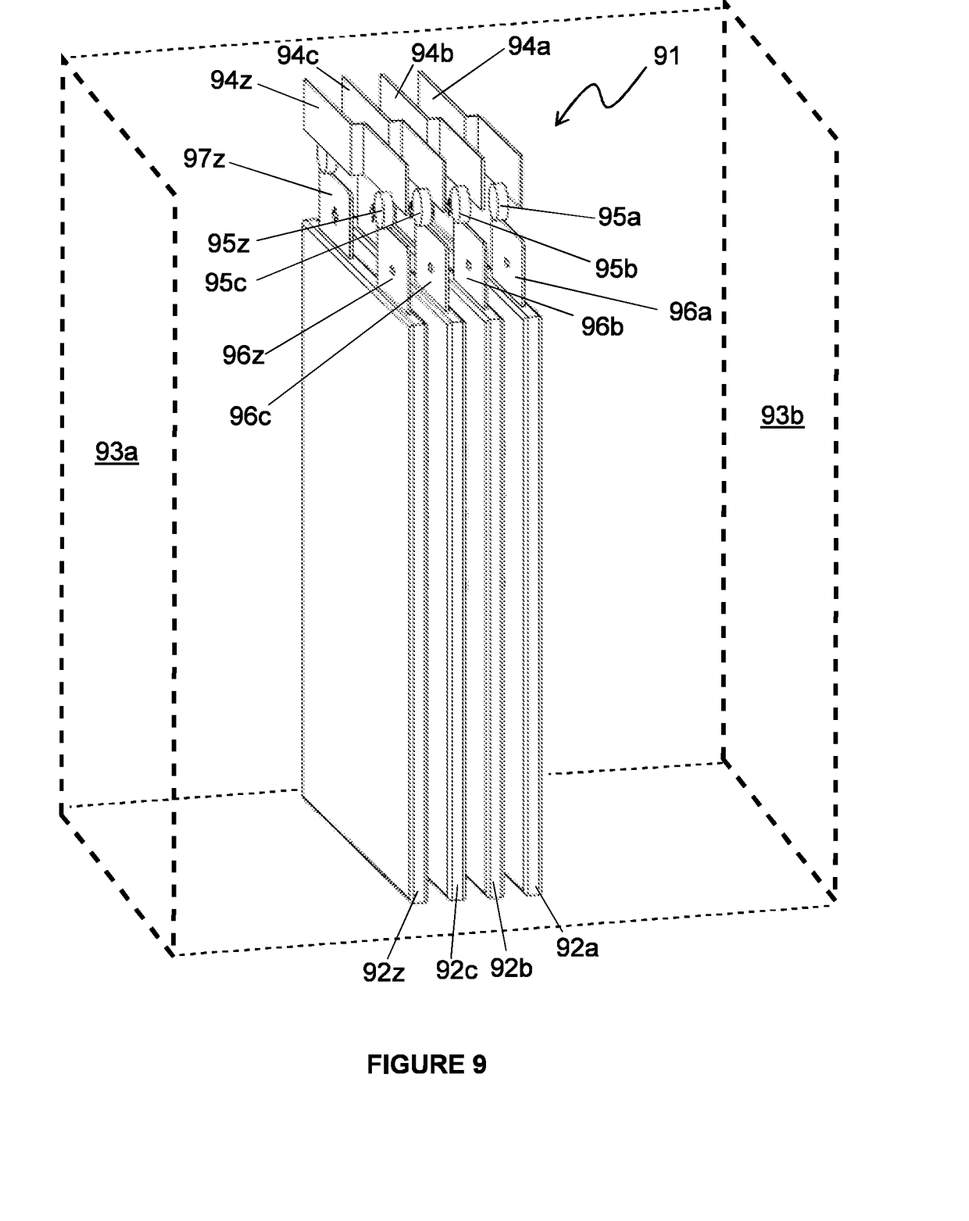
FIG. 9 shows an embodiment of a third battery pack assembly according to the invention.

FIG. 9 shows an exploded view of an embodiment of a pouch cell battery pack assembly 91. The pouch cell battery pack assembly 91 comprises a number of cells 92a, 92b, 92c . . . 92z, a number of conductive plates 94a, 94b, 94c . . . 94z, a number of elastomeric protrusions 95a, 95b, 95c . . . 95z, a number of anode cell terminals 96a, 96b, 96c . . . 96z, and a number of cathode cell terminals (97a, 97b, 97c are not shown) and 97z (the number of cells being chosen according to the design requirements). In this embodiment, the elastomeric protrusions 95a-95z are positioned between the respective conductive plates 94a-94z and the respective anode cell terminals 96a-96z. Another set of elastomeric protrusions (not shown) are positioned between the conductive plates 94a-94z and the respective cathode cell terminals 97a-97c (not shown) and 97z. The conductive plates 94a-94z are in electrical contact with the respective anode cell terminals 96a-96z, and the cathode cell terminals (97a, 97b, 97c are not shown) and 97z. For example, the elastomeric protrusion 95a is positioned between one face of conductive plate 94a and one face of the cell terminal 96a of cell 92a. In use, one or more elastomeric protrusions, for example, elastomeric protrusion 95d may be provided on a holding frame 93a, 93b. The battery pack assembly 91 may be fastened together with fastening means (not shown), which urges together the holding frame 93a, 93b, the elastomeric protrusions 95a-95z, the conducive plates 94a-94z, and the cell terminals 96a-96z to provide solid contact between the cell terminal 96a-96z and the respective conductive plates 94a-94z. Advantageously, the prismatic cell battery pack 91 may be disassembled into its constituent parts when not in use.

Figure 10:
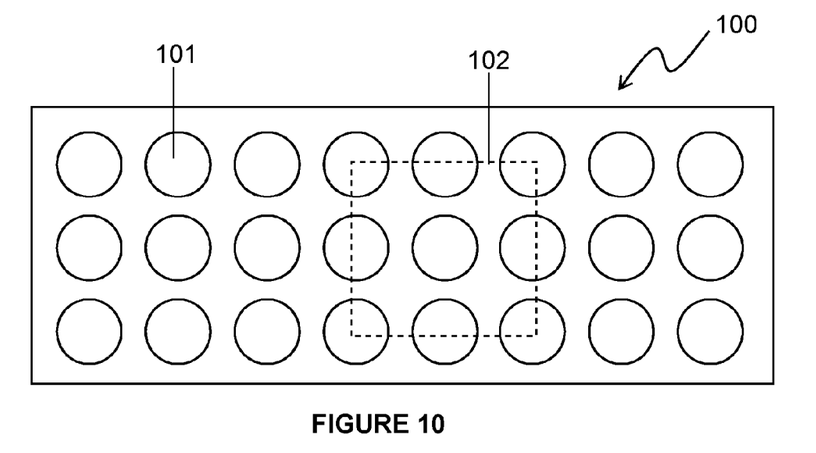
FIG. 10 shows an example of a holding frame according to the invention.

FIG. 10 shows a second example of a holding frame 100 according to the invention. The holding frame 100 comprises a plurality of recesses or rebates 101. The recesses or rebates 101 are linearly arranged in a square configuration 102.

Figure 11:
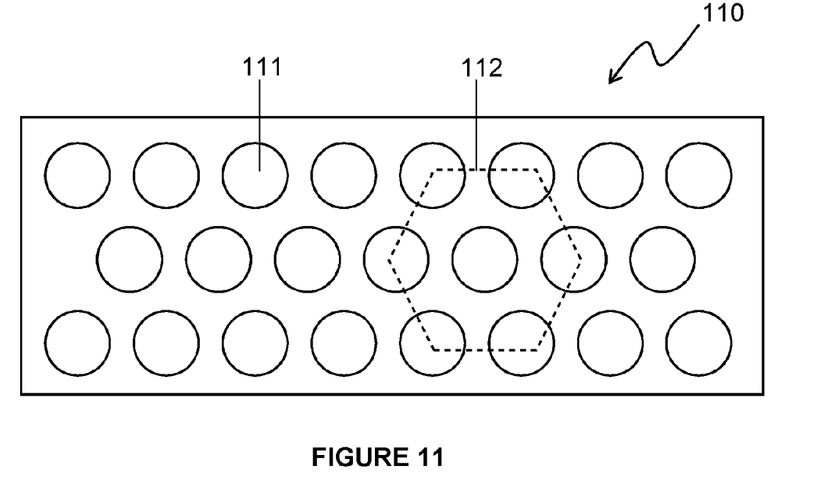
FIG. 11 shows a second example of a holding frame according to the invention.

FIG. 11 shows a third example of a holding frame 110 according to the invention. The holding frame 110 comprises a plurality of recesses or rebates 111. The recesses 111 are linearly arranged in a hexagonal configuration 112.

The recesses 101, 111 of FIG. 10 and FIG. 11 may be any shape that will accommodate a cell (not shown) when the battery pack of the present invention is assembled. In use, elastomeric protrusions (not shown) are provided within the recesses 101, 111 or elsewhere on the holding frame 100, 110 as appropriate.

Figure 12:
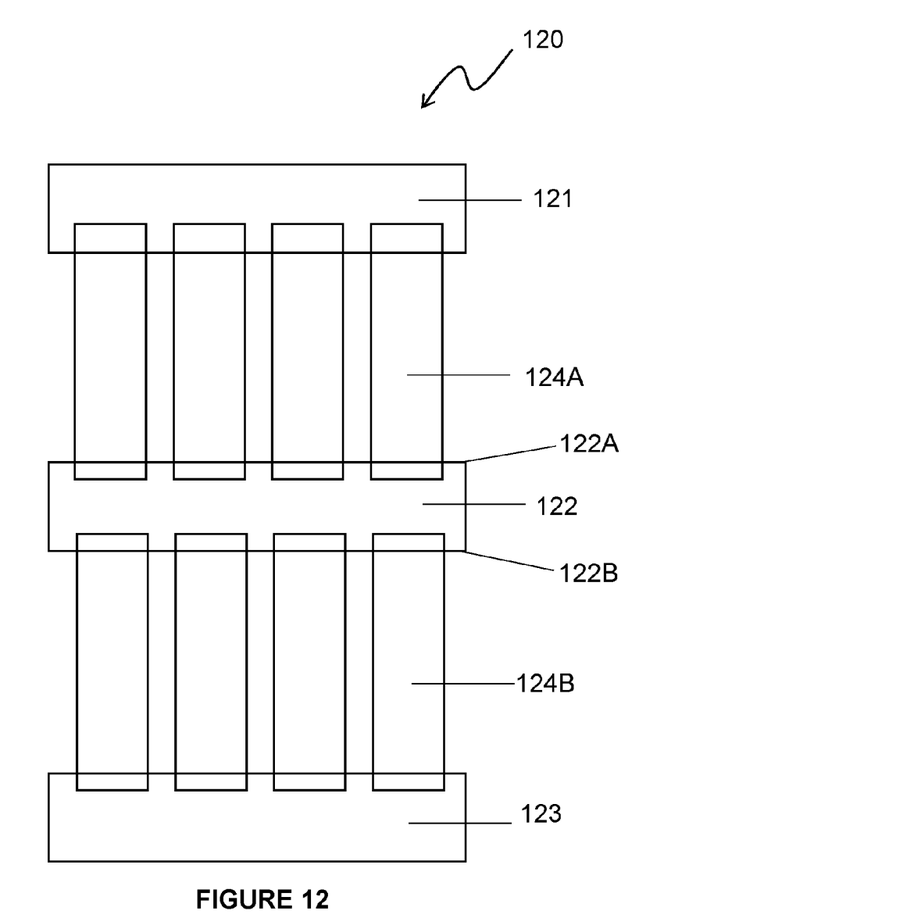
FIG. 12 shows an embodiment of a fourth battery pack assembly according to the invention.

FIG. 12 shows an embodiment of the battery pack assembly 120. The battery pack 120 comprises a first holding frame 121, a second holding frame 122, a third holding frame 123, a first set of cells 124A, and a second set of cells 124B. The second holding frame 122 has a first side 122A and a second side 122B. The holding frames 100 or 110 of FIGS. 10 and 11 may be used in this embodiment as the first, second, or third holding frames 121, 122, 123. The first set of cells 124A are accommodated in recesses (not shown) provided in the first holding frame 121 and recesses (not shown) provided in the first side 122A of the second holding frame 122. The second set of cells 124B are accommodated in recesses (not shown) provided in the second side 122B of the second holding frame 122, and recesses (not shown) provided in the third holding frame 123. The recesses (not shown) may be of the configurations 102 or 112 shown in FIGS. 10 and 11. The second holding frame 122 may possess recesses on both the first side 122A and the second side 122B of the second holding frame 122. Alternatively, the second holding frame 122 may comprise two separate holding frames that are secured together, which possess recesses (not shown) on opposing sides (i.e. the first side 122A and the second side 122B) to accommodate the first set of cells 124A and the second set of cells 124B.

The recess configuration (not shown) of the holding frames 121, 122, 123 is selected to accommodate the shape of the first set of cells 124A and the second set of cells 124B and be complementary to the opposing holding frame. For example, the recess configuration (not shown) of the first holding frame 121 is selected to be complementary to the recess configuration (not shown) of the first side 122A of the second holding frame 122, to accommodate the first set of cells 124A.

The number of cells used in the first set of cells 124A or the second set of cells 124B is not limited to that shown in FIG. 12, and may be selected as appropriate for the application.

In each of the above embodiments the battery pack assembly of the invention may comprise a monitoring means or monitor for monitoring the status of each cell. The monitoring means may comprise an integrated electrical circuit, which monitors the status of each cell by detecting the number of triggered conduction breaking means or conduction breakers resulting from failed cells, i.e. a cell that has exceeded a prescribed electrical and/or thermal limit, within the battery pack assembly. The monitoring means may transmit data, which has been collected about the status of each cell within the assembly, to be fed through an algorithm to compare with the optimal function of the assembly, to determine the number of fully functioning cells and the number of failed cells. Advantageously, this provides information on the overall condition and remaining useful life of the battery pack assembly. More advantageously, this information may be used to inform the user of maintenance requirements, and of potential safety hazards from using an under-performing battery pack assembly.

The above embodiments of the present invention have been described by way of example only and it will be apparent to those skilled in the art that modifications may be made without departing from the scope of the appended claims.

The drawings then show, in a broad aspect, a battery back assembly comprising two holding frames, wherein the two holding frames hold a plurality of cells between them, each cell being held longitudinally between the two holding frames, wherein two or more of the plurality of cells are connected by a conductive means, and wherein the two holding frames are reversibly held together by a fastening means, wherein the fastening means cause terminals of the cells to be urged against the conductive means and removal or loosening of the fastening means enables the cells to be freed from the assembly.

The invention claimed is:

1. A battery pack assembly comprising two holding frames, wherein the two holding frames hold a plurality of pouch cells between them, wherein at least two pouch cells of the plurality of pouch cells are connected by a conductor, and wherein the two holding frames are reversibly held with respect to one another in a closed condition by a fastener, wherein the fastener causes terminals of the two pouch cells to be urged against the conductor and removal or loosening of the fastener enables the pouch cells to be freed from the assembly, the assembly comprising one or more elastomeric protrusions and wherein the conductor is positioned such that at least a part of the conductor lies between one or more elastomeric protrusions and one or more pouch cell terminals, such that with the frames in the closed condition the conductor is urged into contact by the elastomeric protrusions with said one or more pouch cell terminals.

2. A battery pack assembly according to claim 1, wherein the conductor connects the two pouch cells in series.

3. A battery pack assembly according to claim 1, wherein the plurality set of pouch cells are positioned between two parallel holding frames, each pouch cell being held laterally between the two holding frames by virtue of the fastener or fastening means.

4. A battery pack assembly according to claim 1, wherein one of the holding frames is or provides an access lid, which can be opened or removed to gain access to the cells.

5. A battery pack assembly as claimed in claim 1, wherein at least one of the holding frames comprises one or more terminals for connection to an external electrical circuit.

6. A battery pack assembly as claimed in claim 1, wherein the conductor comprises one or more conductive plates.

7. A battery pack assembly as claimed in claim 6, wherein one or more of the conductive plates comprises at least one conductive plate projection to connect to an external electrical circuit.

8. A battery pack assembly as claimed in claim 1, wherein at least one of the holding frames comprises base protrusions extending perpendicularly from the base.

9. A battery pack assembly as claimed in claim 1, wherein at least one of the holding frames comprises a base and side walls.

10. A battery pack assembly as claimed in claim 1, wherein the fastener comprises a plurality of fastening screws.

11. A battery pack assembly as claimed in claim 10, wherein each of the holding frames comprises a plurality of threaded holes through which each fastening screw may be threaded.

12. A battery pack assembly according to claim 1, further comprising one or more frictionally retained conduction breakers.

13. A battery pack assembly according to claim 12, wherein the conduction breaker is positioned between one of the pouch cell terminals and the conductor.

14. A battery pack assembly according to claim 1, wherein the conductor comprises a first part contacting a first terminal of a first of the two pouch cells and a second part contacting a first terminal of a second of the two pouch cells, the elastomeric protrusion being located between the first part and a second terminal of the second of the two pouch cells.

15. A battery pack assembly according to claim 1, further comprising a monitor for monitoring the status of each cell.

16. A battery pack assembly comprising two holding frames, wherein the two holding frames hold a plurality of pouch cells between them, wherein at least two of the pouch cells of the plurality of pouch cells are connected by a conductor, and wherein the two holding frames are reversibly held with respect to one another in a closed condition by one or more fasteners, wherein the fasteners cause terminals of the two pouch cells to be urged against the conductor and removal or loosening of the fasteners enables the pouch cells to be freed from the assembly, the assembly comprising two or more elastomeric protrusions and wherein the conductor is positioned such that at least part of the conductor lies between one or more elastomeric protrusions and one or more pouch cell terminals, wherein an elastomeric protrusion is positioned between the conductor plate and respective terminal of the first pouch cell and between the conductor plate and respective terminal of the second pouch cell, such that with the frames in the closed condition the conductor is urged into contact by the elastomeric protrusions with said one or more terminals.

17. A battery pack assembly according to claim 16, wherein the terminal of the first pouch cell is an anode terminal or a cathode terminal and the terminal of the second pouch cell is a cathode terminal or an anode terminal respectively.

18. A battery pack assembly accordingly to claim 16, wherein the plurality of pouch cells are connected in parallel.

19. A battery pack assembly according to claim 16, wherein the plurality of pouch cells are positioned between two parallel holding frames, each pouch cell being held laterally between the two holding frames by virtue of the fastener or fastening means.

20. A pouch cell battery pack assembly, the pouch cell battery pack assembly comprising a plurality of pouch cells, a plurality of conductive plates having faces and a plurality of elastomeric protrusions located between the faces of the conductive plates and cell terminals, a first holding frame and a second holding frame and fasteners reversibly holding the first holding frame and second holding frame together with the plurality of pouch cells therebetween in a closed condition, and to urge the elastomeric protrusions to force the conductive plates into contact with terminals of the pouch cells.

* * * * *